United States Patent [19]
Allen et al.

[11] Patent Number: 6,024,790
[45] Date of Patent: Feb. 15, 2000

[54] ACTIVATION OF SWELLING CLAYS

[75] Inventors: Adrian Swinburn Allen, North Yorkshire; John Oliver Stockwell, West Yorkshire; Ian James Black, Cumbria, all of United Kingdom

[73] Assignee: Ciba Specialty Chemicals Water Treatments Limited, Bradford, United Kingdom

[21] Appl. No.: 09/142,220

[22] PCT Filed: Mar. 10, 1997

[86] PCT No.: PCT/GB97/00648

§ 371 Date: Oct. 5, 1998

§ 102(e) Date: Oct. 5, 1998

[87] PCT Pub. No.: WO97/33040

PCT Pub. Date: Sep. 12, 1997

[30] Foreign Application Priority Data

Mar. 8, 1996 [GB] United Kingdom ............... 9604927

[51] Int. Cl.[7] ............... C04B 33/02; C04B 33/04
[52] U.S. Cl. ............... 106/486; 106/DIG. 4; 106/416; 501/146; 501/147; 501/145
[58] Field of Search ............... 162/158, 181.1, 162/181.7, 181.8, 183; 106/486, 416, DIG. 4, 400; 501/145, 146, 147

[56] References Cited

U.S. PATENT DOCUMENTS

| | | | |
|---|---|---|---|
| 4,282,059 | 8/1981 | Davidson | 162/158 |
| 4,305,781 | 12/1981 | Langley et al. | 162/164 |
| 4,309,222 | 1/1982 | Hoyt, 4th | 106/288 |
| 4,613,542 | 9/1986 | Alexander | 428/290 |
| 4,624,982 | 11/1986 | Alexander | 524/446 |
| 4,749,444 | 6/1988 | Lorz et al. | 162/168.3 |
| 4,753,710 | 6/1988 | Langley et al. | 162/164.3 |
| 4,913,775 | 4/1990 | Langley | 162/164.3 |
| 4,964,954 | 10/1990 | Johansson | 162/164.6 |
| 4,969,976 | 11/1990 | Reed | 162/164.3 |
| 5,006,574 | 4/1991 | Sennett et al. | 523/351 |
| 5,015,334 | 5/1991 | Derrick | 162/168.1 |
| 5,223,098 | 6/1993 | Cluyse et al. | 162/181.2 |
| 5,223,463 | 6/1993 | Bilimoria et al. | 501/146 |
| 5,266,538 | 11/1993 | Knudson et al. | 501/147 |
| 5,391,228 | 2/1995 | Carroll | 106/486 |
| 5,512,135 | 4/1996 | Carré et al. | 162/175 |
| 5,537,934 | 7/1996 | Jensen et al. | 106/487 |

OTHER PUBLICATIONS

Derwent Abstr. 88–312148.
Derwent Abstr. 86–186120.
Derwent Abstr. 90–186823 for EP 373306.
Derwent Abstr. 94–242341 for EP 608989.
Derwent Abstr. 80–77455C for EP 17353.

*Primary Examiner*—Stanley S. Silverman
*Assistant Examiner*—José A. Fortuna
*Attorney, Agent, or Firm*—David R. Crichton

[57] ABSTRACT

Alkaline earth bentonite can be activated by the use of sodium citrate or other organic sequestering agent as activator. Dry blends of the activator and the bentonite can be provided.

7 Claims, No Drawings

ACTIVATION OF SWELLING CLAYS

This invention relates to the activation of bentonite and to the use of the activated bentonite in paper making.

BACKGROUND OF THE INVENTION

Bentonite is usually obtained initially as an alkali earth compound, for instance a calcium and/or magnesium form of bentonite. In order that it can perform satisfactorily, for instance in paper making, it is necessary to activate the bentonite by subjecting it to ion exchange whereby calcium and/or magnesium is replaced by sodium or other alkali metal or ammonium ion.

The normal way of doing this is to mix the alkaline earth bentonite clay with an aqueous activating solution containing an alkali metal or ammonium compound. For instance the clay may be provided as a powdered pre-blend of the alkaline earth metal clay and the alkali metal or ammonium compound and this pre-blend may be mixed into water and allowed to stand for sufficient time for ion exchange to occur whereafter it is diluted for use. Alternatively the quarried alkaline earth bentonite can be added direct to an aqueous activating solution with mixing.

In practice, the activating compound which is conventionally used is sodium carbonate or sodium bicarbonate, typically in an amount of around 5 to 10% by weight based on the weight of clay. The activation is conducted at the natural pH of the dispersion, around pH 10.

Other electrolytes are described in JP-A-6445754, as being added to promote dispersion. It is also known in U.S. Pat. Nos. 4,613,542 and 4,624,982 to include sodium polyacrylate. Concentrates of bentonite with various alkali metal compounds are also described in EP 485124 and U.S. Pat. Nos. 5,266,538 and 5,391,228. The bentonite that is introduced into these concentrated slurries can initially be in the form of sodium bentonite but EP 485,124 and U.S. Pat. No. 5,391,228 also mention making slurries by blending calcium bentonite and sodium carbonate activator with water and sodium chloride. Paper making processes using bentonite with an anionic organic polymer are also described in EP 373306 and U.S. Pat. No. 5,015,334.

One problem with known activated bentonites (for instance the activated bentonite powders which are commercially available) is that the sodium carbonate or other activator which is included in them causes the bentonite (when mixed with water) to give a relatively high pH, for instance above pH 9 and often around pH 10. Accordingly it is necessary to handle the bentonite with the care associated with materials which do generate a pH of around pH 10.

Another problem is that the conventional sodium carbonate activator undergoes ion exchange during the activation process to form calcium carbonate, with the result that inorganic scale may be formed and deposited from aqueous compositions of these activated bentonites. This is a particular problem when the water in which the bentonite is being dispersed is, naturally, relatively hard.

Another difficulty with known activated bentonite powders is that it is sometime found to be rather difficult to make a stable aqueous dispersion of the powders. Again, it has been found that these difficulties of achieving a stable dispersion increase with increasing hardness of the water. Thus, when using relatively hard water, for instance having a hardness of above 10° dH and generally in the range 15° to 50° dH, various problems can arise.

Further, the performance of the bentonite, especially when used in paper making, can be less effective at lower pH values than at higher pH values, and in particular bentonite activated in conventional manner tends to be less effective in acid paper making processes (for instance when the cellulosic suspension has a pH of below 6.5 and often in the range 4.2 to 5.5) than when the suspension has higher pH values.

We have now discovered a new range of activators which can give improved performance.

DETAILED DESCRIPTION OF THE INVENTION

According to a first aspect of the invention, we provide a dry clay composition comprising a blend of an alkaline earth bentonite swelling clay and an activating amount of an alkali metal or ammonium salt of a sequestering agent selected from phosphonates, hydroxy carboxylic acids, amino carboxylic acids and poly carboxylic acids.

According to a second aspect of the invention, we provide a process of activating an alkaline earth bentonite swelling clay to an alkali metal bentonite swelling clay comprising mixing the alkaline earth swelling clay with an aqueous activating solution containing an ammonium or alkali metal salt of a sequestering agent selected from phosphonates, hydroxy carboxylic acids, amino carboxylic acids and di- or tri- (or higher) carboxylic acids.

In both aspects of the invention, the sequestering agent is preferably introduced as a sodium salt.

In both aspects of the invention, the sequestering agent is preferably sodium citrate.

The resultant activated bentonites have several advantages. They are easier to handle since they are less alkaline. They can give better performance than the same bentonite subjected to conventional activation with sodium carbonate at about pH 10. They can perform more effectively in paper making processes where conventional activated bentonites are less effective due to the pH or the presence of hardness salts. Thus conventional bentonites tend to be less effective when the cellulosic suspension has pH below about 6.5, for instance in the range 4.2 to 5.5, but the activated bentonites obtained in the invention can perform very well in such suspensions without any significant loss of activity.

Conventional activated bentonites also may have inferior performance when the cellulosic suspension is made using relatively hard water, for instance having a hardness above 10° dH and typically in the range 15° dH to 50° dH Improved performance is obtained using the activated bentonites obtained in the invention in such hard waters. This improvement may be manifested by improved drainage rates or by reducing scale deposition or both.

The activation process can be conducted by separately introducing the swelling clay and the sequestering agent activator into the water, for instance by adding the swelling clay to a solution of the activator or by adding the activator to a dispersion of the swelling clay. In each of these alternatives, the swelling clay can be introduced as a powder or as a slurry.

Preferably, however, the process is conducted by mixing a pre-blend of the swelling clay and the activator with an appropriate amount of water. The pre-blend is preferably a powder but it can be a liquid composition containing the bentonite and the activator.

The amount of water present during the activation process is generally such that the swelling clay concentration during the process is from 2 to 8% or even up to 10%. Usually it is at least 3% and frequently it is not more than about 5 or 6%, with 4 or 5% often being preferred. These are the amounts which are typical for sodium carbonate activation processes and it is convenient that the same can be used in the invention.

However a further advantage of the activators used in the invention is that they will also cause good activation at a much wider range of concentrations and so good activation can be achieved at clay concentrations in the range 8 to 14 or 15%. Despite the clay activating during this process and thus potentially becoming very viscous, an advantage of the activators is that the resultant compositions still have adequately low viscosity and good fluid flow properties that they can be handled easily.

It is also possible to conduct the activation at even higher clay concentrations, for instance in the range 15 to 40%. We describe in our copending PCT application . . . (reference PRL03666WO filed even date herewith claiming priority from GB 9604950.7) concentrates having a clay concentration of 15 to 40% and which contain an activating amount of sodium citrate.

The sequestering agent seems to function by exchanging with the alkaline earth ions and fixing the exchanged calcium or magnesium ions in a form such that they cannot exchange back into the bentonite. The sequestering agent is usually in the sodium form as this is the preferred cation which is introduced by ion exchange into the bentonite. However other activating cations can be used if desired, such as potassium or ammonium.

Suitable phosphonates which can be used as the sequestering agent can be selected from any of the phosphonates which are known for sequestering alkaline earth metal ions, such as the materials sold under the trade name Dequest.

Suitable hydroxy carboxylic acids that can be used include materials such as sodium tartrate or gluconate but the preferred material is sodium citrate. The free acid form can be used if required in preference to the water soluble salt.

Suitable amino carboxylic acids include materials such as DTPA, NTA and EDDHA and EDTA.

Di- or tri- (or higher) carboxylic acids which can be used include malonic acid, succinic acid, glutaric acid, adipic acid and oxalic acid, usually as sodium salts. The acids (and all the sequestering agents) are preferably low molecular weight materials, for instance having a molecular weight below 500 and are usually monomeric. The use of high molecular weight sodium polyacrylate in slurries is already known in EP 485124 and 4613542 and 4624982 but this does not give the benefits of the invention.

The sequestering agent must be used in an amount sufficient to give activation in the defined system and this will be found by routine experimentation. On a weight basis it is generally in the range 1 to 20% based on the dry weight of bentonite, most preferably in the range 3 to 15%.

All these amounts assume that the sequestering agent is the only significant activating material in the composition. Blends of one or more of the sequestering agents may be used and blends of one or more of the sequestering agents with other beneficial activators such as sodium carbonate can be used if required. If sodium carbonate is present, then it may reduce the amount of sequestering agent which is required. The amount of sequestering agent may have to be increased significantly if undesirable components such as sodium chloride are present to any significant extent and accordingly it is preferred that no deliberate additions of simple electrolytes such as sodium chloride, sulphate or nitrate are made.

As the bentonite, one can use any of the anionic swelling clays that are conventionally referred to as bentonite-type clays or as bentonites. They are generally smectites or montmorillonites, the latter being preferred. Suitable smectite or montmorillonite clays include Wyoming bentonite and Fullers Earth and various clays include those known by the chemical terms of hectorite and bentonite. The clay will be in the alkaline earth form, usually calcium or calcium and magnesium form.

It is very well known to include bentonite in paper making processes for various purposes and the invention is applicable to all of these. For instance the bentonite may be included as a pitch dispersant.

One paper-making process to which the invention can be applied is a process in which bentonite is added to a cellulosic suspension, typically in an amount of 0.02 to 2% dry weight and a medium or high molecular weight (e.g., above 500000) polymeric retention aid is added subsequently, generally after the last point of high shear (for instance just in front of the head box immediately prior to drainage). The high molecular weight polymer can be non-ionic, anionic or cationic. The cellulosic suspension can be made from relatively pure pulp or from pulp having a relatively high cationic demand.

Processes of this type that are of particular value are those in which the pulp has a relatively high cationic demand and the polymer is substantially non-ionic or anionic and the paper product is preferably newsprint or fluting medium. Processes of this type in which the total filler content is relatively low are described in U.S. Pat. No. 4,305,781 and EP-A-17353 to which reference should be made for further details of suitable non-ionic or low ionic polymers and suitable cellulosic suspensions and which is hereby incorporated by reference. More highly anionic or cationic polymers may be used. These processes are of particular value when the cellulosic suspension contains de-inked waste. Suitable polymers and fillers (when the pulp is filled) are also described in EP-A-608989 and AU-A-63977/86.

The invention is of particular value when applied to microparticulate retention processes in which a polymeric retention aid is added to the aqueous suspension, the suspension is subjected to shearing and the bentonite is then added after the shearing, and often after the last point of high shear, for instance just prior to the head box prior to drainage. The polymer may be non-ionic or anionic but is often cationic.

The cationic polymer can be a natural material such as cationic starch but is preferably a substantially linear synthetic cationic polymer having molecular weight above 500,000. The amount of cationic polymer that is present in the dispersion at the time of shearing should be sufficient that flocs are formed by the addition of the polymer and the flocs are broken by the shearing to form microflocs that resist further degradation by the shearing but that carry sufficient charge to interact with the bentonite to give better retention and/or formation than is obtainable when adding the polymer alone after the last point of high shear.

The shearing can be due merely to turbulent passage along a duct or can be due to passage through a centriscreen, a pump or other shear-applying device.

Preferred processes include those commercialised by the applicants under the trade mark Hydrocol and preferred processes are described in, for instance, U.S. Pat. Nos. 4,753,710, 4,913,775 and 4,969,976 all of which are hereby incorporated by reference. The optimum amount of polymer for any particular process can be determined by routine experimentation, and will depend inter alia on whether low or medium molecular weight cationic polymer, and/or dry strength resin, had been incorporated in the aqueous suspension at some earlier stage.

The activated bentonite of the invention can be used wherever activated bentonite is useful, for instance in pulp dewatering, paper sludge dewatering, liquid/solids separation processes, effluent clarification, inky waste water clarification and pitch fixing (in paper making processes). The activated bentonite can also be used in other industries which utilise activated bentonite, for instance in the preparation of bentonite for iron ore pelletisation or other mineral processing uses.

The following are some examples.

EXAMPLE 1

5 parts by weight calcium bentonite was activated in 95 parts by weight of an aqueous solution containing the activator, and the amount of activator, specified below. In each instance, the amount of activator is expressed as a percentage based on the dry weight of bentonite. The products which were used we as follows.

| | | |
|---|---|---|
| A - sodium carbonate | –6% | |
| C - sodium citrate | –17% | |
| D - sodium EDTA | –21%. | |

The activated bentonites prepared in Example 1 are used in a laboratory simulation of the paper making process as described in U.S. Pat. No. 4,753,710. In particular a thinstock of 0.5% bleached Kraft Fibre Furnish has added to it 500 g/t of a high molecular weight (intrinsic viscosity 6 dl/g) cationic polyacrylamide formed from 40% by weight dimethylaminoethyl acrylate quarternised by methyl chloride and 60% by weight acrylamide. The cellulosic suspension is sheared for 60 seconds 1,500 rpm, the activated bentonite is then added in the dose specified, the suspension subjected to gentle mixing in a baffled Britt jar and the Schopper Reigler drainage times recorded for 700 ml to drain from 1,000 ml of the thinkstock. In this test, the lowest possible drainage time gives the best results, and low bentonite amounts are preferred.

In the following tables, the figures in the columns marked "Bentonit" are in g/t dry weight and the figures in the columns marked with a letter are the drainage time in seconds when using the specified amount of the activated bentonite identified in Example 1.

In this table, the column headed Ca represents the results using unactivated calcium bentonite.

TABLE 1

| Bentonite | Ca | A | C | D |
|---|---|---|---|---|
| 0 | 63 | 63 | 63 | 63 |
| 500 | 64 | 41 | 37 | 56 |
| 1000 | 62 | 25 | 25 | 49 |
| 2000 | 61 | 18 | 15 | 36 |
| 4000 | 58 | 14 | 11 | 20 |

This data shows that citrate activation (column C) can give results as good as or better than sodium carbonate activation as regards drainage time, and that adequate, but less satisfactory, results can be obtained using EDTA (column D).

What is claimed is:

1. A dry clay composition comprising a blend of alkaline earth bentonite and an activating amount of an alkali metal or ammonium salt of a sequestering agent selected from the group consisting of phosphonates, hydroxy carboxylic acids, amino carboxylic acids and di or tri carboxylic acids.

2. A composition according to claim 1 in which the salt is a sodium salt.

3. A composition according to claim 1 or claim 2 in which the sequestering agent is sodium citrate.

4. A process of activating an alkaline earth bentonite comprising mixing the alkaline earth bentonite with an aqueous activating solution containing an activating amount of an alkali metal or ammonium salt of a sequestering agent selected from the group consisting of phosphonates, hydroxy carboxylic acids, amino carboxylic acids and di or tri carboxylic acids.

5. A process according to claim 4 in which the sequestering agent is in the form of a sodium salt.

6. A process according to claim 4 in which the sequestering agent is sodium citrate.

7. A process according to claim 4 conducted at a bentonite concentration of 2 to 14% by weight.

* * * * *